April 7, 1925.
F. W. STEWART
1,532,163
METHOD OF FORMING HOLLOW GLASSWARE
Filed Feb. 23, 1923  3 Sheets-Sheet 1
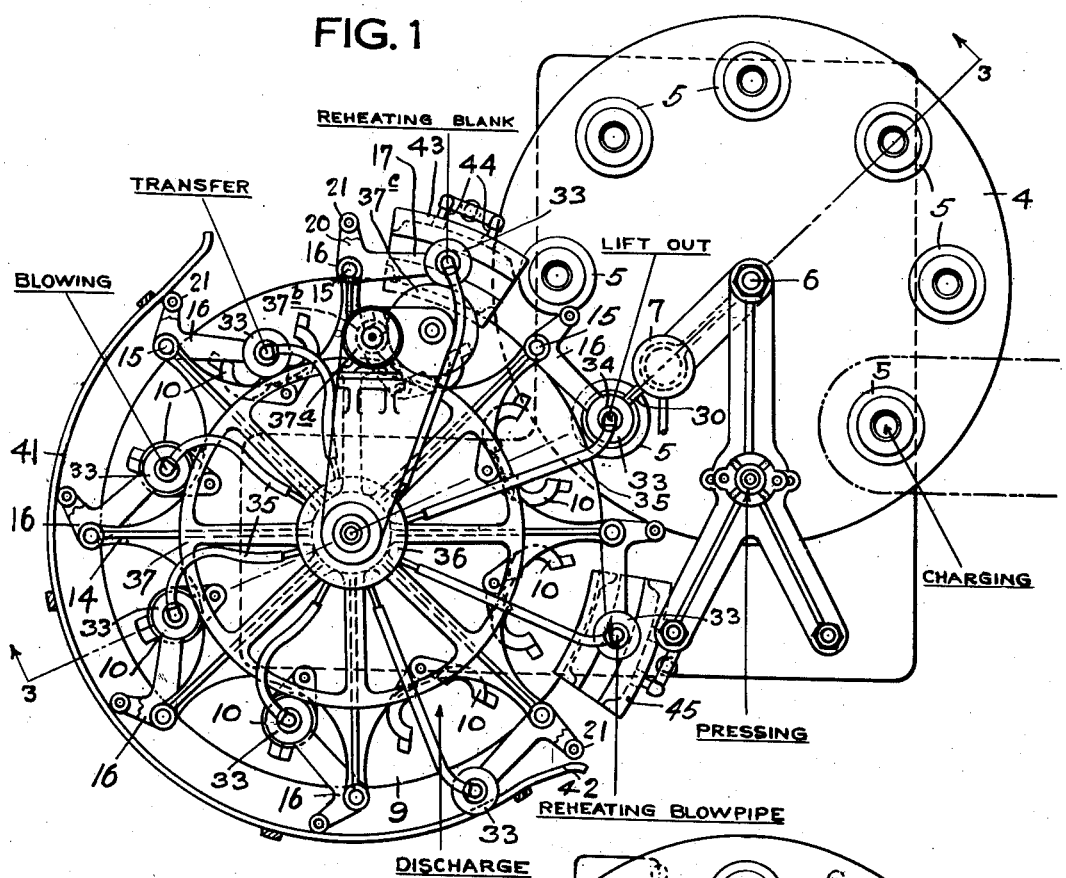
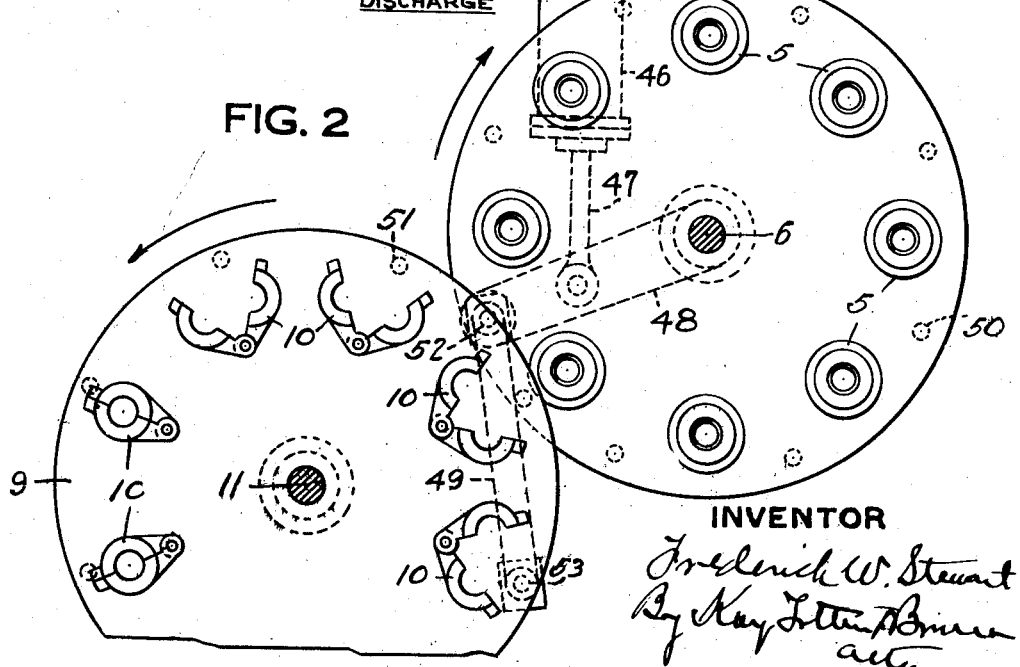
INVENTOR

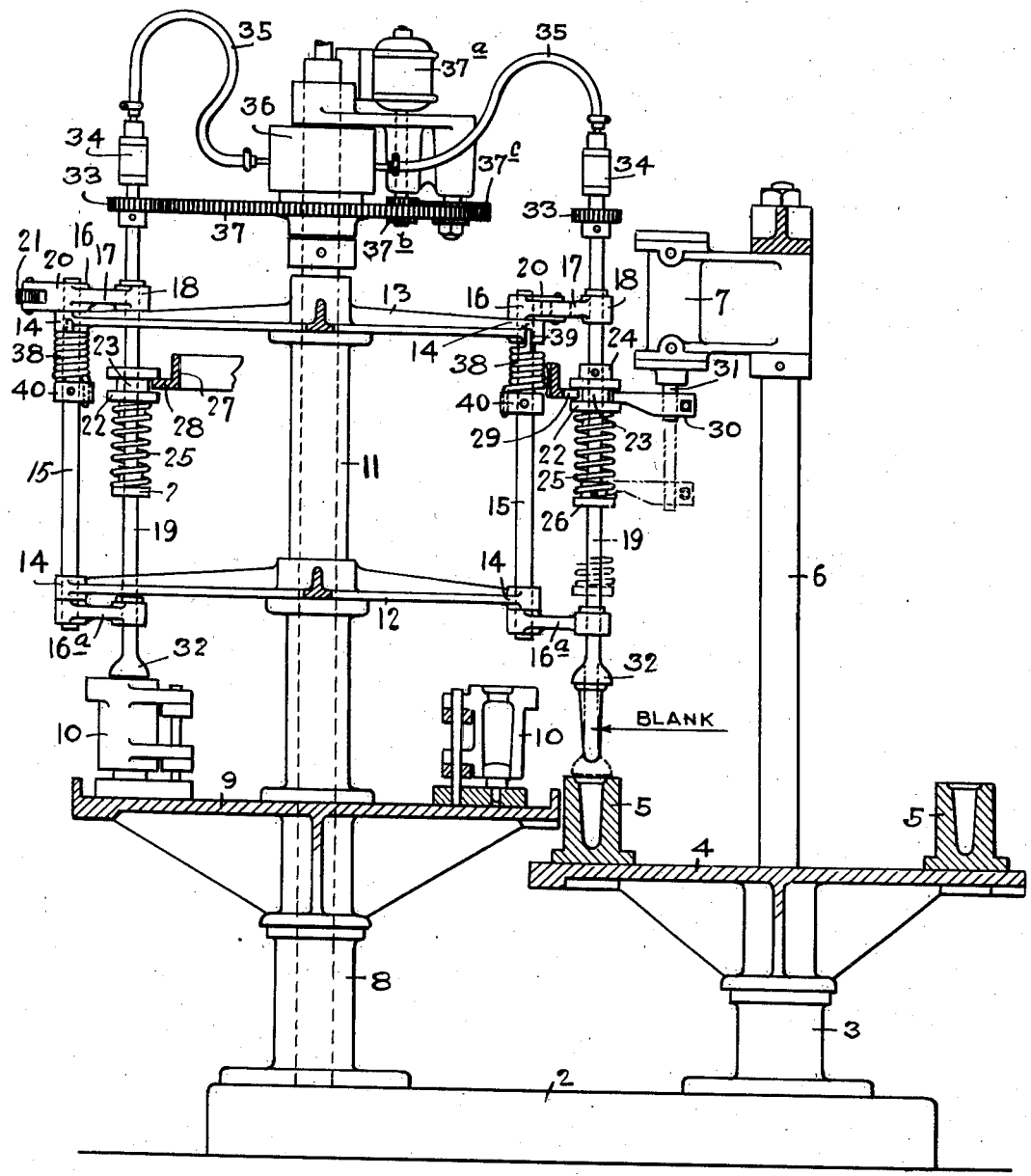

April 7, 1925.　　　　　　　　　　F. W. STEWART　　　　　　　　　1,532,163
METHOD OF FORMING HOLLOW GLASSWARE
Filed Feb. 23, 1923　　　3 Sheets-Sheet 3
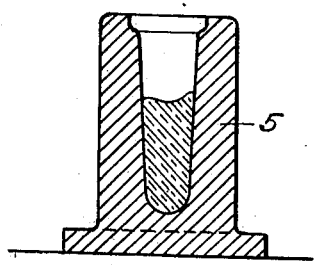
FIG. 4
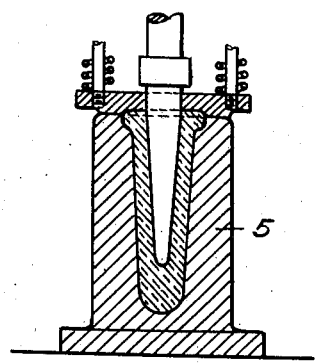
FIG. 5
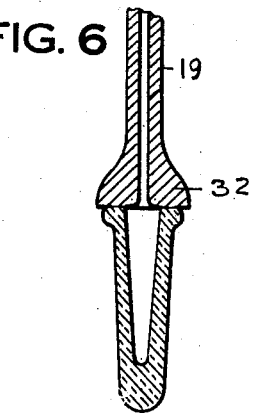
FIG. 6
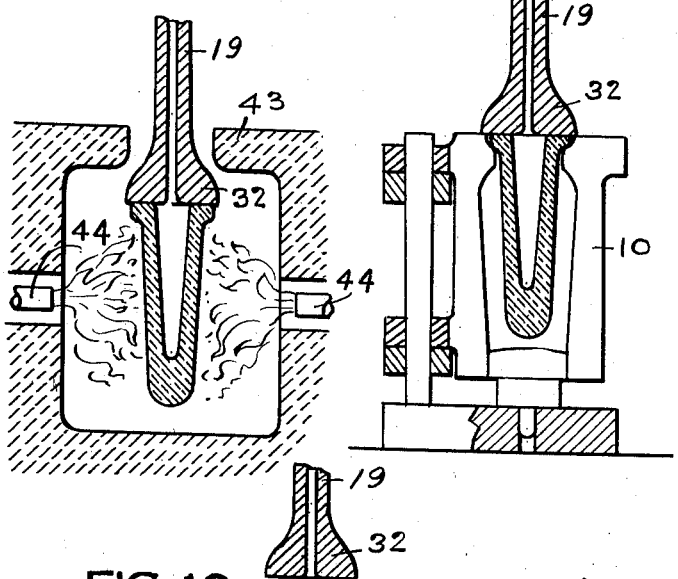
FIG. 7　　FIG. 8
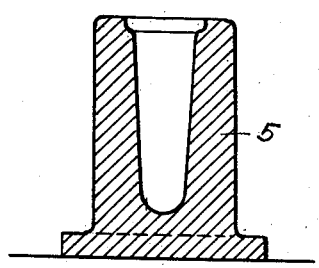
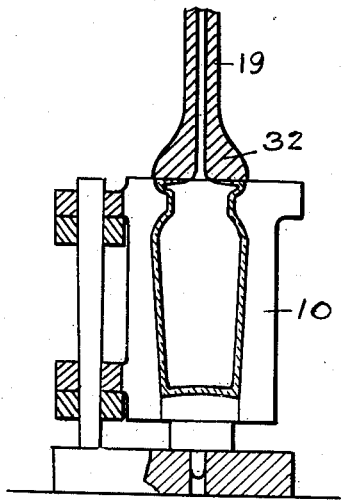
FIG. 9
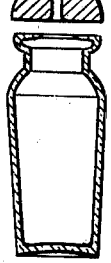
FIG. 10
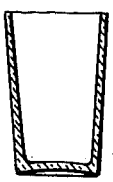
FIG. 11
INVENTOR
Frederick W. Stewart Patented Apr. 7, 1925.

1,532,163

UNITED STATES PATENT OFFICE.

FREDERICK W. STEWART, OF OAK PARK, ILLINOIS, ASSIGNOR TO INLAND GLASS COMPANY, OF CHICAGO, ILLINOIS, A CORPORATION OF DELAWARE.

METHOD OF FORMING HOLLOW GLASSWARE.

Application filed February 23, 1923. Serial No. 620,674.

*To all whom it may concern:*

Be it known that I, FREDERICK W. STEWART, a citizen of the United States, and resident of Oak Park, in the county of Cook and State of Illinois, have invented a new and useful Improvement in Methods of Forming Hollow Glassware; and I do hereby declare the following to be a full, clear, and exact description thereof.

My invention relates to a method of forming hollow glassware such as tumblers and other articles.

The invention consists generally stated in pressing a blank in a suitable mold, sticking up the open end of the blank with a sticking-up tool having an air passage extended through it, reheating the blank where necessary, introducing the blank into a blow-mold and blowing the blank with air admitted through the sticking-up tool.

In the accompanying drawing, Fig. 1 is a plan view of apparatus for carrying out my improved method; Fig. 2 is a plan view of the rotary tables showing the manner of rotating said tables simultaneously and in unison; Fig. 3 is a vertical elevation, partly in section, of the apparatus for carrying out my method; Fig. 4 is a view of a mold with the glass therein ready for pressing; Fig. 5 shows the pressing operation; Fig. 6 shows the withdrawal of the blank from the mold by the sticking-up tool; Fig. 7 shows the reheating of the blank; Fig. 8 shows the blank introduced into the blow mold; Fig. 9 shows the article blown in the mold by air admitted through the sticking-up tool; Fig. 10 shows the article removed from the mold and separated from the sticking-up tool; and Fig. 11 shows the finished article or tumbler after the upper end has been cracked off.

In the drawings the numeral 2 designates a suitable base carrying the pedestal 3 on which is mounted the rotary table 4. Suitable blank-molds 5 are mounted at intervals on the table 4.

The central column 6 has at its upper end the cylinder 7.

As the apparatus for carrying out my method may vary, and as the ordinary means for pressing the blank is so well known, it has not been deemed necessary to illustrate the same other than diagrammatically, as indicated in Fig. 1, where charging and pressing positions are indicated.

The pedestal 8 is mounted on the base 2, and said pedestal supports the rotary table 9 which carries the blow-molds 10 located at suitable intervals thereon.

Mounted on the central pillar 11 are the spider frames 12 and 13 with the projecting arms 14, said spider frames being connected by the rods 15 passing through the outer ends of said arms. Secured to the upper ends of the rods 15 are the bell-cranks 16. Extending through bearings 18 on the longer arms 17 of the bell-cranks 16 are the combined blow-pipes and sticking-up tools 19. The shorter arms 20 of the bell-cranks 16 have the friction rollers 21. Secured to the lower ends of the rods 15 are the arms 16ª through which the lower ends of the tools 19 pass.

Each tool 19 is provided with the collar 22 having an annular groove 23 formed therein. This collar is loosely mounted on the tool 19 and is held against upward movement by the small collar 24 secured to the tool 19. A spring 25 is interposed between the collar 22 and the abutment 26 which is secured to the tool 19.

The rail 27 has the outwardly extending flange 28 which normally engages the groove of the collar 22 and holds the tool in raised position. However, said flange is cut away, as at 29 where the tool 19 is to be lowered and in such case the arm 30 on the piston-rod 31 of the cylinder 7 acts as a support for the tool 19, as indicated in Fig. 3.

The tool 19 has an air-passage extending through it and at the lower end of said tool is the sticking-up head 32 which is adapted to engage the open end of the blank, as will more fully hereinafter appear.

The upper end of the tool 19 has the pinion 33 secured thereto, and above said pinion the connection 34 to which the hose 35 is connected. The other end of the hose is connected up to the air reservoir 36 to which air is supplied from any suitable source.

A gear wheel 37 is mounted on the central pillar 11 with which the pinions 33 are adapted to engage for rotating the tool 19 during the blowing operation. The gear 37 is driven from the motor 37ª through the intermediate pinions 37ᵇ and 37ᶜ.

The bell-cranks 16 have the springs 38 connected thereto, as at 39, said springs being coiled around the rods 15 and connected to the collars 40 on said rods. These springs 38 return the bell-cranks to normal position after the rollers 31 on the smaller arms of said bell-cranks have passed from the cam-rail 41, and in order that said springs may operate gradually to bring said bell-cranks to normal position the cam-rail is gradually bent outward as at 42.

In order to reheat the blank, a reheating chamber 43 is provided in the path of movement of the blank, said heating chamber having the burners 44, the flames from which impinge on the blank as it is held in said chamber.

A second reheating chamber 45 is provided for reheating the sticking-up head 32 of the tool 19 after it has been separated from the article blown, and before it is brought in position to engage a new blank.

In order to operate the tables 4 and 9 intermittently and at the same time simultaneously, I provide the cylinder 46, the piston rod 47 of which is connected to the arm 48 connected to the table 4. The outer end of the arm 48 is pivotally connected to the arm 49 on the table 9. The tables 4 and 9 have the notches or recesses 50 and 51 formed therein with which pins or latches 52 and 53 on the arms 48 and 49, respectively, are adapted to engage, whereby said tables are moved intermittently and simultaneously.

In carrying out my improved method by the above apparatus, a suitable amount of molten glass is delivered into the blank-mold 5 at the charging position when the table 4 is stationary, and on the next movement of the table the mold is brought around into pressing position when the plunger 55 is lowered into the mold, as indicated in Fig. 5, to press the blank. By the next movement of the table 4 the mold, with the blank therein, is moved around to the position for the sticking-up tool to operate, which is lowered by the downward movement of the piston-rod 31 to bring the head 32 into engagement with the open end of the blank, which seals it up, whereupon the piston-rod 31 is raised and the tool 19 lifted, carrying with it the blank, as indicated in Fig. 6, where the blank is shown as withdrawn from the mold. By the next movement of the table 9 the blank suspended from the tool is carried into reheating position in the chamber 43 where it is played upon by the flames from the burners 44 and the blank reheated. The blank is rotated during its reheating step due to the fact that the pinion 33 has come into engagement with the gear-wheel 37ᶜ and a rotary movement is imparted to the tool 19. When the blank has been properly heated by the next movement of the table 9, the blank is moved into the blow-mold 10 which is then closed around the blank, and thereupon air is delivered by the pipe 35 into the passage of the tool 19 and thence into the blank which is blown out into the shape of the mold, as indicated in Fig. 9. The blow-mold is then opened, and by the next movement of the table 9 the blank is withdrawn from the blow-mold, and by slightly tapping the sticking-up head 32 the blown article is separated from the sticking-up head, as indicated in Fig. 10, and all that remains to be done is to crack off the upper end to form the finished tumbler, as shown in Fig. 11.

The tool 19 then passes to the reheating chamber 45 to be reheated for the next sticking-up operation.

By my invention I do away with neck-rings for supporting the blank in the blow-mold or the snaps for securing the upper end of the blank during the blowing operation and I seal the open end of the blank to prevent the escape of the air.

What I claim is:

1. The method of forming hollow glassware consisting in providing a sticking-up tool, heating said tool, pressing a blank, sticking-up the open-end of the blank, introducing the blank into a blow-mold, and blowing the blank with air admitted through the sticking-up tool.

2. The method of forming hollow glassware consisting in providing a sticking-up tool, heating said tool, pressing a blank, sticking up the open-end of the blank, reheating the blank, introducing the blank into a blow-mold, and blowing the blank with air admitted through the sticking-up tool.

In testimony whereof I, the said FREDERICK W. STEWART, have hereunto set my hand.

FREDERICK W. STEWART.